(12) United States Patent
Bisht et al.

(10) Patent No.: US 9,456,030 B2
(45) Date of Patent: Sep. 27, 2016

(54) METHODS OF OPERATING LOAD BALANCING SWITCHES AND CONTROLLERS USING MODIFIED FLOW ENTRIES

(71) Applicant: TELEFONAKTIEBOLAGET L M ERICSSON (PUBL), Stockholm (SE)

(72) Inventors: Ashutosh Bisht, Bangalore (IN); Prashant Anand, Bangalore (IN); Rajesh Ishwariah Balay, Bangalore (IN); Mustafa Arisoylu, San Jose, CA (US); Brian Alleyne, Los Gatos, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 193 days.

(21) Appl. No.: 14/486,650

(22) Filed: Sep. 15, 2014

(65) Prior Publication Data

US 2016/0080481 A1 Mar. 17, 2016

(51) Int. Cl.
*H04L 1/00* (2006.01)
*H04L 29/08* (2006.01)
*H04L 12/721* (2013.01)

(52) U.S. Cl.
CPC ........... *H04L 67/1002* (2013.01); *H04L 45/38* (2013.01); *H04L 67/1004* (2013.01)

(58) Field of Classification Search
CPC  H04L 12/2602; H04L 47/621; H04L 49/101
USPC ................................................ 370/235, 252
See application file for complete search history.

(56) References Cited

U.S. PATENT DOCUMENTS

| | | |
|---|---|---|
| 5,960,431 A | 9/1999 | Choy |
| 6,282,605 B1 | 8/2001 | Moore |
| 6,601,084 B1 | 7/2003 | Bhaskaran et al. |
| 6,944,678 B2 | 9/2005 | Lu et al. |
| 7,321,926 B1 | 1/2008 | Zhang et al. |
| 7,328,237 B1 | 2/2008 | Thubert et al. |
| 7,647,424 B2 | 1/2010 | Kim et al. |
| 7,653,700 B1 | 1/2010 | Bahl et al. |
| 7,808,897 B1* | 10/2010 | Mehta ................. H04L 12/2602 370/230 |
| 7,822,871 B2 | 10/2010 | Stolorz et al. |

(Continued)

OTHER PUBLICATIONS

Mori T. et al., "Identifying Elephant Flows Through Periodically Sampled Packets," In *Proceedings of the 4th ACM SIGCOMM conference on Internet measurement* (IMC '04). ACM, New York, NY, USA, Oct. 2004, pp. 115-120.

(Continued)

*Primary Examiner* — Wanda Z Russell

(57) ABSTRACT

A method of operating a load balancing switch may include providing a flow entry in a flow table, the flow entry may include a match pattern that is satisfied by a data flow identification, and the flow entry may identify a first server. A first data packet including a first data flow identification may be received, and the first data packet may be transmitted to the first server responsive to the first data flow identification satisfying the match pattern. After transmitting the first data packet to the first server, the flow entry may be modified so that the flow entry identifies the first server and a second server. After modifying the flow entry, a second data packet including a second data flow identification may be received, and the second data packet may be transmitted to the first and second servers responsive to the second data flow identification satisfying the match pattern.

24 Claims, 11 Drawing Sheets

(56) References Cited

U.S. PATENT DOCUMENTS

| | | |
|---|---|---|
| 7,908,605 B1 | 3/2011 | Graupner et al. |
| 8,136,025 B1 | 3/2012 | Zhu et al. |
| 8,547,878 B2 * | 10/2013 | Sundararaman ...... H04L 47/621 370/230 |
| 8,825,867 B2 | 9/2014 | Arisoylu et al. |
| 8,838,817 B1 | 9/2014 | Biswas |
| 8,929,374 B2 | 1/2015 | Tonsing et al. |
| 8,958,293 B1 | 2/2015 | Anderson |
| 9,036,481 B1 | 5/2015 | White |
| 9,118,571 B2 | 8/2015 | Bisht et al. |
| 9,137,165 B2 | 9/2015 | Anand et al. |
| 2002/0032798 A1 | 3/2002 | Xu |
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0065762 A1 | 4/2003 | Stolorz et al. |
| 2003/0177253 A1 | 9/2003 | Schuehler et al. |
| 2004/0049596 A1 | 3/2004 | Schuehler et al. |
| 2005/0261985 A1 | 11/2005 | Miller et al. |
| 2006/0221974 A1 | 10/2006 | Hilla |
| 2006/0233106 A1 | 10/2006 | Achlioptas |
| 2006/0288119 A1 | 12/2006 | Kim et al. |
| 2009/0141638 A1 | 6/2009 | Dolisy |
| 2009/0161696 A1 | 6/2009 | Song |
| 2009/0201935 A1 * | 8/2009 | Hass ............... G06F 9/30054 370/395.32 |
| 2010/0080233 A1 | 4/2010 | Kwapniewski et al. |
| 2010/0265835 A1 | 10/2010 | Haley et al. |
| 2011/0026403 A1 | 2/2011 | Shao et al. |
| 2011/0142064 A1 | 6/2011 | Dubal et al. |
| 2011/0145386 A1 | 6/2011 | Stolorz et al. |
| 2011/0185065 A1 | 7/2011 | Stanisic et al. |
| 2011/0191477 A1 | 8/2011 | Zhang et al. |
| 2012/0002546 A1 * | 1/2012 | Sundararaman ...... H04L 49/101 370/235 |
| 2012/0020210 A1 * | 1/2012 | Sonnier ............ H04L 47/621 370/230.1 |
| 2012/0093160 A1 * | 4/2012 | Tonsing ............. H04L 12/5602 370/392 |
| 2012/0095974 A1 | 4/2012 | Bentkofsky et al. |
| 2012/0179607 A1 | 7/2012 | Abifaker et al. |
| 2012/0281698 A1 | 11/2012 | Forster et al. |
| 2013/0064088 A1 * | 3/2013 | Yu ...................... H04L 45/38 370/235 |
| 2013/0136011 A1 * | 5/2013 | Tardo ................ H04L 63/0245 370/252 |
| 2013/0266014 A1 | 10/2013 | Blomquist |
| 2013/0297798 A1 | 11/2013 | Arisoylu et al. |
| 2014/0108638 A1 | 4/2014 | Ko et al. |
| 2014/0211621 A1 | 7/2014 | Sundaram et al. |
| 2014/0372567 A1 | 12/2014 | Ganesh et al. |
| 2015/0029853 A1 | 1/2015 | Raindel et al. |
| 2015/0078375 A1 | 3/2015 | Hendel |
| 2015/0312155 A1 | 10/2015 | Anand et al. |

OTHER PUBLICATIONS

Ben Fredj S. et al., "Statistical Bandwidth Sharing: A Study of Congestion at Flow Level," in Proceedings of ACM SIGCOMM, pp. 111-122, Aug. 2001.

Mori, T., et al. "On the characteristics of Internet traffic variability: Spikes and Elephants," In Proceedings of IEEE/IPSJ SAINT, Tokyo, Japan, Jan. 2004, the whole document.

Papagiannaki K. et al., "On the Feasibility of Identifying Elephants in Internet Backbone Traffic," Sprint ATL Technical Report TR01-ATL-110918, Sprint Labs, Nov. 2001, the whole document.

Thompson K. et al., "Wide-area internet traffic patterns and characteristics," IEEE Network, vol. 11, No. 6, Nov./Dec. 1997, pp. 10-23.

Lu, Y. et al., "ElephantTrap: A low cost device for identifying large flows," High-Performance Interconnects, Symposium on, 15th Annual IEEE Symposium on High-Performance Interconnects (HOTI 2007), 2007, pp. 99-108.

Mckeown N. et al., "OpenFlow: Enabling Innovation in Campus Networks," Mar. 14, 2008, the whole document.

Uppal H. et al. "OpenFlow Based Load Balancing," University of Washington CSE651: Networking Project Report, reproduced Jun. 27, 2013, the whole document.

"OpenFlow Switch Specification," Version 1.1.0 Implemented (Wire Protocol 0x02), Feb. 28, 2011, the whole document.

* cited by examiner

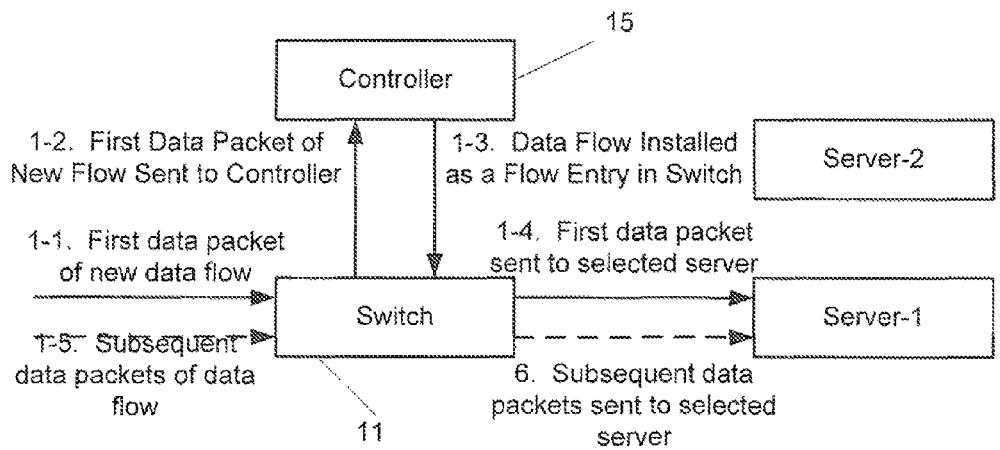
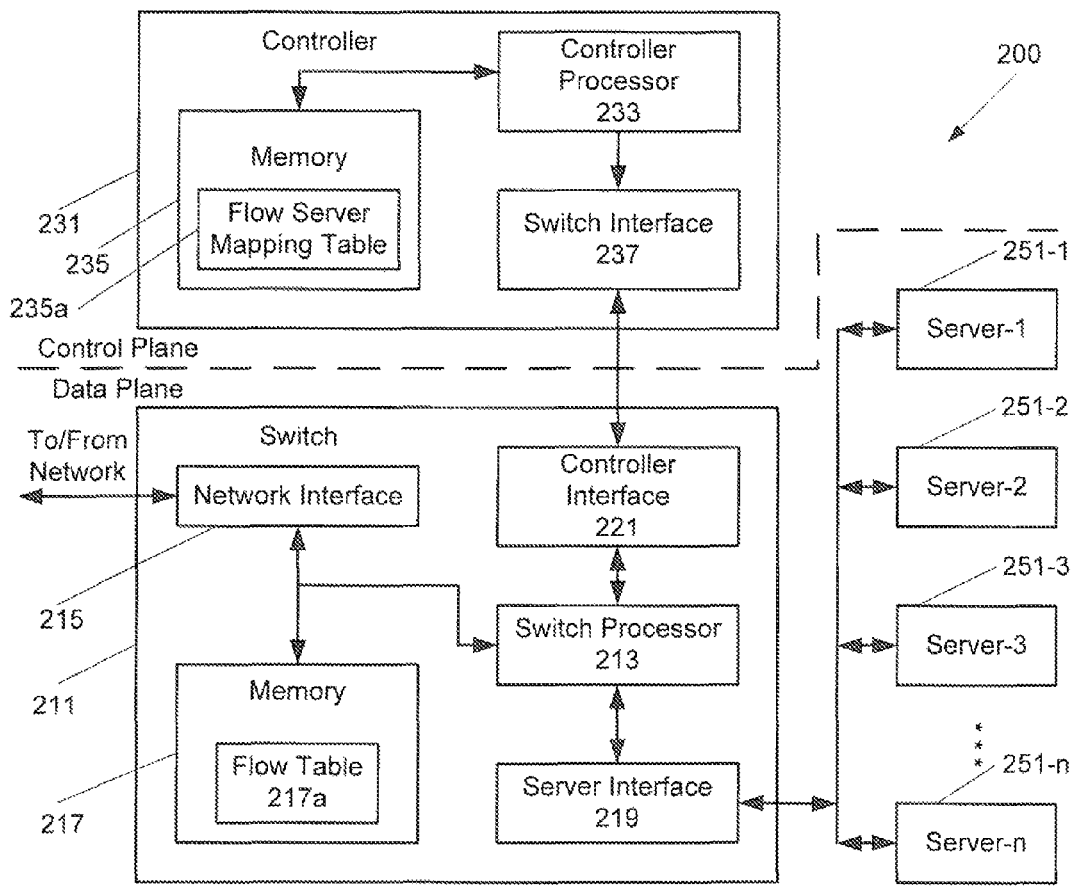

Figure 3

| Flow Entry ID | Match Pattern For IP Source Address (MP) | Server ID | Action (A) | Priority (P) |
|---|---|---|---|---|
| FE-1 | X.X.X.1 | Server-1 | S | Low |
| FE-2 | X.X.X.2 | Server-2 | S | Low |
| FE-3 | X.X.X.3 | Server-3 | S | Low |
| FE-4 | X.X.X.4 | Server-4 | S | Low |
| FE-5 | X.X.X.5 | Server-1 | S | Low |
| *** | *** | *** | *** | *** |
| FE-255 | X.X.X.255 | Server-3 | S | Low |

# METHODS OF OPERATING LOAD BALANCING SWITCHES AND CONTROLLERS USING MODIFIED FLOW ENTRIES

TECHNICAL FIELD

The present disclosure is directed to data networks and, more particularly, to data network load balancing and related methods, controllers, and switches.

BACKGROUND

In today's high-traffic internet, it may be desirable to have multiple servers representing a single logical destination server to share load. A typical configuration may include multiple servers behind a load-balancer to determine which server will service a client's request. Such hardware may be expensive, may have a rigid policy set, and may be a single point of failure. An alternative load-balancing architecture, using an OpenFlow switch connected to an OpenFlow controller (such as a NOX controller), may provide increased flexibility in policy, reduced costs, and/or potential to be more robust to failure with future generations of switches. OpenFlow architectures are discussed, for example, by: Uppal, Hardee et al., "OpenFlow Based Load Balancing," University of Washington, http://people.cs.umass.edu/~hardeep/cse561_openflow_project_report.pdf, 7 pages, reproduced Jun. 27, 2013; McKeown, Nick et al., "OpenFlow: Enabling Innovation in Campus Networks," http://sb.tmit.bme.hu/sonkoly/files/openflow/openflow-wp-latest.pdf, 6 pages, Mar. 14, 2008; and "OpenFlow Switch Specification," Version 1.1.0 Implemented (Wire Protocol 0x02), 56 pages, Feb. 28, 2011. The disclosures of all of the above referenced documents are hereby incorporated herein in their entireties by reference.

An OpenFlow switch (also referred to as a switch) is similar to a standard hardware switch with a flow table used to perform packet lookup and forwarding. The difference lies in how flow rules are inserted and updated inside the switch's flow table. A standard switch can have static rules inserted into the switch or can be a learning switch where the switch inserts rules into its flow table as it learns on which interface (switch port) a machine is. In contrast, an OpenFlow switch uses an external OpenFlow controller (also referred to as a controller) to add rules into its flow table.

An OpenFlow controller is an external controller (external to the switch) that is responsible for adding and/or removing new rules into the OpenFlow switch's flow table. The OpenFlow switch is connected to the controller and communicates over a secure channel using the OpenFlow protocol. Current designs of OpenFlow may only allow one controller per switch. In current load balancer designs using OpenFlow, the controller decides how packets of a new flow should be handled by the switch. When new flows arrive at the switch, the packet is redirected to the controller which then decides whether the switch should drop the packet or forward it to a machine connected to the switch. The controller can also delete or modify existing flow entries in the switch.

The controller can execute modules that describe how a new flow should be handled. This may provide an interface to write C++ modules that dynamically add or delete routing rules into the switch and can use different policies for handling flows.

A flow table flow entry of an OpenFlow switch includes header fields, counters, and actions. Each flow table flow entry stores Ethernet, IP and TCP/UDP header information. This information includes destination/source MAC and IP address and source/destination TCP/UDP port numbers. Each flow table flow entry also maintains a counter of numbers of packets and bytes arrived per flow. A flow table flow entry can also have one or more action fields that describe how the switch will handle packets that match the flow entry. Some of the actions include sending the packet on all output ports, forwarding the packet on an output port of a particular machine and modifying packet headers (Ethernet, IP and TCP/UDP header). If a flow entry does not have any actions, then by default, the switch drops all packets for the particular flow.

Each Flow entry may also have an expiration time after which the flow entry is deleted from the flow table. This expiration time is based on the number of seconds a flow was idle and the total amount the time (in seconds) the flow entry has been in the flow table. The controller can chose a flow entry to exist permanently in the flow table, or it can set timers which delete the flow entry when the timer expires.

Because an OpenFlow controller is external to (i.e., separate and/or remote from) an associated OpenFlow switch, delay/latency may result for communications between the controller and switch, thereby delaying transfer of data packets to the intended servers.

SUMMARY

It may therefore be an object to address at least some of the above mentioned disadvantages and/or to improve network performance. According to some embodiments, for example, a volume of communications traffic between a load balancing switch and controller may be reduced and/or delay transmitting data packets to servers may be reduced.

According to some embodiments, a method may be provided to operate a switch coupled with a plurality of servers and a controller in a load balancing system. A flow entry may be provided in a flow table, the flow entry may include a match pattern that is satisfied by a data flow identification, and the flow entry may identify a first server of the plurality of servers. A first data packet including a first data flow identification may be received, and the first data packet may be transmitted to the first server responsive to the first data flow identification satisfying the match pattern. After transmitting the first data packet to the first server, the flow entry may be modified to add an identification of a second server so that the flow entry identifies the first server and the second server. After modifying the flow entry, a second data packet including a second data flow identification may be received, and the second data packet may be transmitted to the first server and to the second server responsive to the second data flow identification satisfying the match pattern.

Involvement of the controller in data flow processing and/or consumption of computing resources at the controller may thus be reduced. Moreover, consumption of network resources may be reduced because traffic to/from the controller may be reduced. In addition, resources used to maintain high availability of the controller may be reduced.

The first and second data flow identifications may be the same so that the first and second data packets are of a same data flow. In this case, an abort message may be received from the second server corresponding to the second data packet after transmitting the second data packet to the first and second servers, and the abort message may be redirected to the controller.

After redirecting the abort message to the controller, a dedicated flow entry may be installed in the flow table for the data flow of the first and second data packets. The dedicated flow entry may include a match pattern that is satisfied by the data flow identification of the first and second data packets, and the dedicated flow entry may identify the first server.

After installing the dedicated flow entry, a third data packet may be received including a third data flow identification that is the same as the first and second data flow identifications so that the third data flow identification matches the match pattern of the flow entry and the match pattern of the dedicated flow entry. Responsive to the third data flow identification matching the match pattern of the dedicated flow entry, the third data packet may be transmitted to the first server.

After installing the dedicated flow entry, the flow entry may be modified to remove the identification of the first server so that the flow entry identifies the second server without identifying the first server. After modifying the flow entry to remove the identification of the first server, a fourth data packet may be received having a fourth data flow identification different than the first data flow identification. Responsive to the fourth data flow identification matching the match pattern of the flow entry without matching the match pattern of the dedicated flow entry, the fourth data packet may be transmitted to the second server without transmitting the fourth data packet to the first server.

Before receiving the second data packet, an abort message flow entry may be installed in the flow table, and the abort message flow entry may includes the match pattern of the flow entry. More particularly, redirecting the abort message may include redirecting the abort message responsive to the abort message matching the match pattern of the abort message flow entry.

After modifying the flow entry to remove the identification of the first server, the abort message flow entry may be un-installed from the flow table.

The first and second data flow identifications may be different data flow identifications of respective first and second data flows.

The second server may not be identified by the flow entry between receiving and transmitting the first data packet.

The flow entry may be a default flow entry, and the match pattern may include at least one unrestricted character so that the match pattern is satisfied by a plurality of data flow identifications.

The flow entry may be a first flow entry in the flow table, the match pattern may be a first match pattern, and the data flow identification may be a first data flow identification. In addition, a second flow entry may be provided in the flow table, the second flow entry may include a second match pattern that is satisfied by a second data flow identification, the second flow entry may identify a third server of the plurality of servers, and the first and second match patterns may be different.

According to some other embodiments, a method may be provided to operate a controller coupled with a switch in a load balancing system, wherein the switch provides a flow table to define processing for received data packets. An instruction may be transmitted to install a flow entry in the flow table at the switch wherein the flow entry includes a match pattern that is satisfied by a flow identification, and wherein the flow entry identifies a first server of the plurality of servers. After transmitting the instruction to install the flow entry, an instruction may be transmitted to modify the flow entry in the flow table at the switch to add an identification of a second server so that the flow entry identifies the first server and the second server.

An instruction may be transmitted to install an abort message flow entry in the flow table, and the abort message flow entry may include the match pattern of the of the flow entry.

Transmitting the instruction to install the abort message flow entry may precede transmitting the instruction to modify the flow entry.

After transmitting the instructions to install the abort message flow entry and modify the flow entry, an abort message generated by the second server (Server-2) and redirected from the switch responsive to the abort message flow entry may be received.

Responsive to receiving the abort message, an instruction may be transmitted to install a dedicated flow entry in the flow table for a data flow corresponding to the abort message, the dedicated flow entry may include a match pattern that is satisfied by a data flow identification from the abort message, and the dedicated flow entry may identify the first server.

After transmitting the instruction to install the dedicated flow entry, an instruction may be transmitted to modify the flow entry to remove the identification of the first server so that the flow entry identifies the second server without identifying the first server.

Transmitting the instruction to modify the flow entry to remove the identification of the first server may include transmitting the instruction to modify the flow entry to remove the identification of the first server responsive to passage of a threshold period of time without receiving an abort message generated by the second server.

After transmitting the instruction to install the dedicated flow entry, an instruction may be transmitted to un-install the abort flow entry from the flow table.

A data flow identification may be obtained from the first server wherein the data flow identification is for a data flow being handled by the first server. Responsive to receiving the data flow identification for the data flow being handled by the first server, an instruction may be transmitted to install a dedicated flow entry in the flow table for a data flow being handled by the first server, the dedicated flow entry may include a match pattern that is satisfied by the data flow identification obtained from the first server, and the dedicated flow entry may identify the first server.

The flow entry may be a default flow entry, and the match pattern may include at least one unrestricted character so that the match pattern is satisfied by a plurality of data flow identifications including the data flow identification.

The flow entry may be a first flow entry, the match pattern may be a first match pattern, and the data flow identification may be a first data flow identification. In addition, an instruction may be transmitted to install a second flow entry in the flow table, the second flow entry may include a second match pattern that is satisfied by a second data flow identification, and the first and second match patterns may be different.

According to some other embodiments, a load balancing switch may include a controller interface configured to provide communications with a load balancing controller, a server interface configured to provide communications with a plurality of servers, a network interface configured to provide communications with a plurality of client devices over a network, and a memory configured to provide a flow table including a flow entry wherein the flow entry includes a match pattern that is satisfied by a data flow identification, and wherein the flow entry identifies a first server of the plurality of servers. In addition, a switch processor may be coupled to the controller interface, the server interface, the network interface, and the memory. More particularly, the processor may be configured to receive a first data packet including a first data flow identification. Responsive to the first data flow identification satisfying the match pattern, the processor may be configured to transmit the first data packet to the first server. The processor may be configured to modify the flow entry to add an identification of a second server so that the flow entry identifies the first server and the second server, after transmitting the first data packet to the first server. The processor may be configured to receive a second data packet including a second data flow identification after modifying the flow entry, and to transmit the second data packet to the first server and to the second server responsive to the second data flow identification satisfying the match pattern.

According to yet other embodiments, a load balancing controller may include a switch interface configured to provide communications with a load balancing switch including a flow table to define processing for received data packets, and a processor coupled to the switch interface. The processor may be configured to, transmit an instruction to install a flow entry in the flow table at the switch wherein the flow entry includes a match pattern that is satisfied by a flow identification, and wherein the flow entry identifies a first server of the plurality of servers. The processor may also be configured to transmit an instruction to modify the flow entry in the flow table at the switch to add an identification of a second server so that the flow entry identifies the first server and the second server, after transmitting the instruction to install the flow entry.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 1 is a block diagram illustrating conventional processing of first and subsequent data packets of a data flow using a load balancing system including a switch and a controller;

FIG. 2 is a block diagram of a load balancing system including a switch, a controller, and a plurality of servers according to some embodiments of inventive concepts;

FIG. 3 is diagram illustrating a flow table of a switch of FIG. 2 including default flow entries according to some embodiments of inventive concepts;

DETAILED DESCRIPTION

Figure 4:
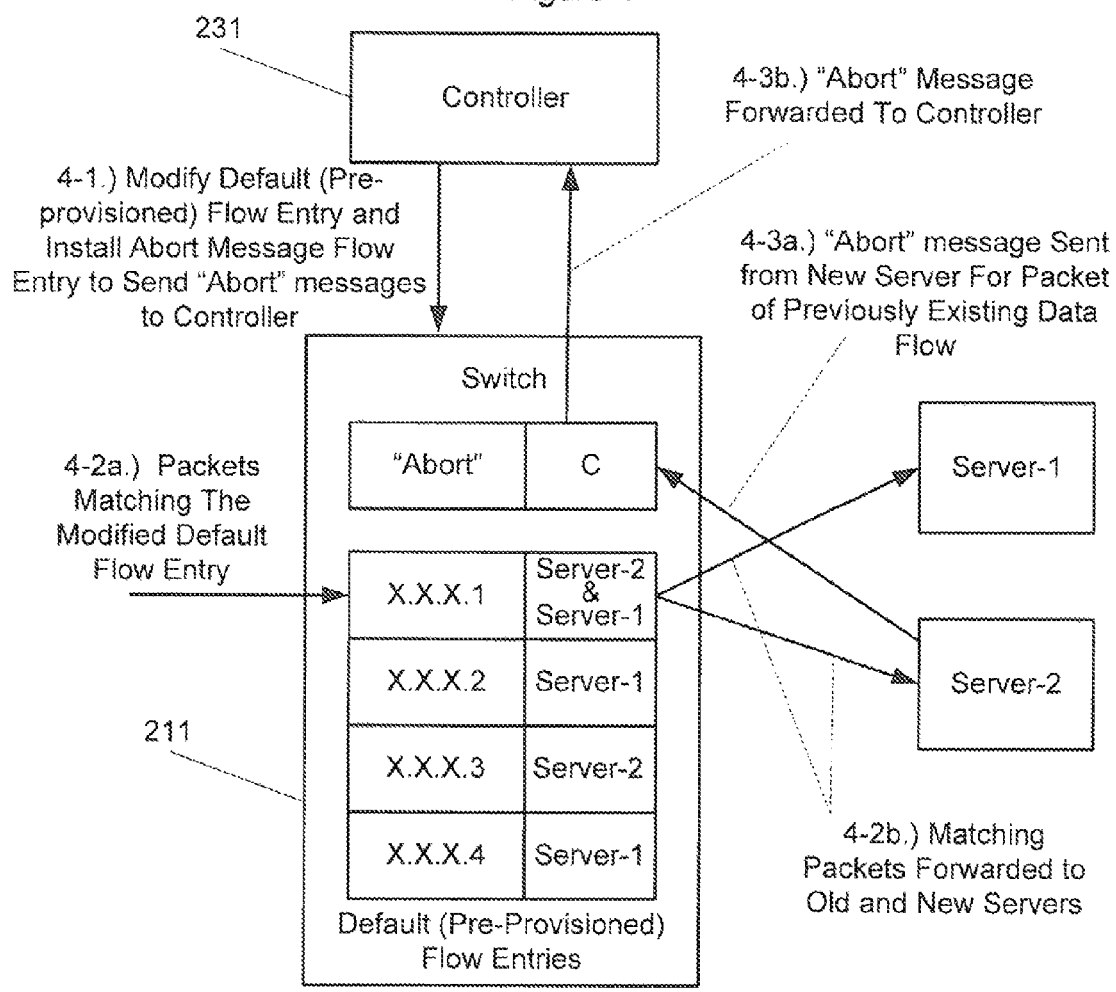
FIGS. 4, 5, and 6 are schematic diagrams illustrating operations of the load balancing system of FIG. 2 according to some embodiments of inventive concepts.

Embodiments of present inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. It should also be noted that these embodiments are not mutually exclusive. Components from one embodiment may be tacitly assumed to be present/used in one or more other embodiments. According to embodiments disclosed herein, a blade may be interpreted/implemented as a server and/or a server may be interpreted/implemented as a blade.

With advent of Software Defined Networking (SDN), applications are being created that make use of this newer way to design networks.

In an SDN paradigm, the control plane is separated from the data plane. The control plane module/element is referred to as a controller, and the data plane module/element is referred to as a switch. The controller and the switch may typically be provided in/as separate machines (e.g., machines/devices that are remote from each other). Accordingly, communication between controller and switch may have non-trivial latency, which may be different from previous architectural approaches where the control plane and data plane are co-located even if they are separate.

In a naive server load balancing application using an SDN paradigm, the controller installs flow entries in a flow table at the switch that associate various data flows with respective servers, and the controller is separated out from the switch by design, usually on a different machine/device that is remote from the switch. Such a design, however, may cause the following problems:

1) If for every new flow, the controller chooses the server that should handle the new flow, then latency may be introduced during flow setup towards the chosen server because the controller may be a physical entity that is separate from the switch; and 2) If the controller is not involved in choosing the server that should handle a new flow, then the switch may have to make such decisions, but the switch may be unable to provide sufficiently granular, dynamic load distribution of flows among servers.

A switch may be unable to provide sufficiently granular, dynamic load balancing because a switch may have limited storage, and a switch may thus be unable to maintain states of all granular flows. A flow state may be required to ensure that existing flows are not disturbed by dynamic load distribution.

Moreover, in OpenFlow based architectures, flow entries may be installed by the controller (and not by the switch). In this situation, the switch may only be able to do static load distribution among servers.

Dynamic load distribution of flows may be an integral function of load-balancers. Such re-distribution may be necessitated by changing external conditions, such as, addition or removal of servers. Without the controller, only a rudimentary level of static load distribution may be performed by a switch. Load distribution is discussed, for example in: U.S. application Ser. No. 13/919,375 filed Jun. 17, 2013; U.S. application Ser. No. 13/919,411 filed Jun. 17, 2013; U.S. application Ser. No. 13/919,388 filed Jun. 17, 2013; and U.S. application Ser. No. 13/936,745 filed Jul. 8, 2013. The disclosures of all of the above referenced applications are hereby incorporated herein in their entireties by reference.

Accordingly, if dynamic distribution of flows to servers is required, then latency may be introduced during flow setup towards a chosen server. If flow setup towards the chosen server is to be done without introducing latency, then only static/rudimentary load balancing may be performed.

Load balancers are typically used to support server load balancing/sharing. In order to balance/share load, a load balancer directs incoming new flows to one of the servers from a pool of servers at the load balancing system. A server can be selected for each new flow using diverse methods such as round-robin selection, random selection, weighted random selection, etc.

Once a server is selected for a new data flow, the flow is sent to the selected server so that all subsequent data packets of the data flow are sent to same selected server. To provide that all data packets of each data flow are sent to the respective server for that data flow, the load balancer may maintain data flow to server mappings that are stored in a table referred to as a flow table.

Load balancer functionality can thus be split in two modules: (1) a controller that assigns each new incoming flow to a respective server; and (2) a switch that maintains a flow table with the flow-to-server mappings for existing flows.

With the Openflow protocol, load-balancers can be built using a controller and dataplane switches. One such solution is described in the reference by Uppal, Hardeep et al. entitled "OpenFlow Based Load Balancing" (http://people.cs.umass.edu/~hardeep/cse561_openflow_project_report.pdf, reproduced Jun. 27, 2013), the disclosure of which is hereby incorporated herein in its entirety by reference. An example of handling a new flow is illustrated in FIG. 1 with solid lines indicating handling of a first data packet for a new data flow and dashed lines indicating handling of subsequent data packets of the data flow. As shown in FIG. 1: (1-1) when a first data packet for a new incoming flow is received at the dataplane switch 11 (also referred to as a switch or an Openflow switch), (1-2) the first data packet of the new incoming data flow is sent from the switch 11 to the controller 15 (also referred to as an Openflow controller), (1-3) the controller 15 installs the data flow details (including the assigned server) as a flow entry in a flow table of the switch 11, and (1-4) the first data packet of the new flow is sent to the server (Server-1) assigned (by the controller 15) for the data flow as set forth in the flow entry. As indicated by dashed lines: (1-5) when subsequent data packets of the data flow are received at the switch 11; (1-6) the subsequent data packets are sent to the assigned server (server-1) using the flow table (with the installed flow entry) without intervention of controller 15. Stated in other words, header information (e.g., addressing information) of the subsequent data packets match a match pattern of the flow entry allowing switch 11 to identify data packets belonging to the data flow for the flow entry and to process these data packets using the associated flow entry.

With the load balancer design of FIG. 1, latency of flow setup (to server) may be increased because the first data packet of the data flow is sent to Controller 15. Since controller 15 and switch 11 may be implemented on/using separate/remote machines/devices, the sending of the first packet to controller 15 at operation (2) and installing the data flow at operation (3) may introduce significant latency in flow setup. Because controller 15 may be involved in the setup of every flow, there may be a requirement for high availability on controller 15 and/or a connection path between switch 11 and controller 15, a requirement for a high computational rate at controller 15, and/or a requirement for high network bandwidth. For example, controller 15 for SDN based load balancing may need to be able to process high rates of incoming packets for a full duration for which load balancer functionality is used. Moreover, a network link between controller 15 and switch 11 may need to have high capacity for a full duration for which load balancing functionality is used.

U.S. patent application Ser. No. 13/936,745 entitled "Methods of Operating Load Balancing Switches And Controllers Using Matching Patterns With Unrestricted Characters" may address some issues discussed above with respect to load balancing. U.S. application Ser. No. 13/936,745, for example, discusses flow table flow entries that are pre-provisioned by the controller, and these pre-provisioned flow entries may map incoming data traffic flows to respective backend servers without first sending a data packet of a new flow to the controller. As a result, latency issues associated with SDN based load balancers may be reduced.

According to some embodiments of inventive concepts illustrated in FIG. 2, a load balancing system 200 may include a switch 211, a controller 231, and a plurality of servers 251-1, 251-2, 251-3, . . . 251-n. Switch 211 may include switch processor 213 coupled to controller interface 221, server interface 219, network interface 215, and memory 217. Network interface 215 may provide a communications interface to client devices through a network or networks, such as one or more of the Internet, a local area network(s), a wide area network(s), etc. Controller interface 221 may provide a communications interface to controller 231 (for example using an OpenFlow channel), and server interface 219 may provide a communications interface to servers 251 of the load balancing system 200. Controller 231 may include controller processor 233 coupled to switch interface 237 and memory 235. Switch interface 237 may provide a communications interface with switch 211 (for example using an OpenFlow channel). As indicated by the dashed line, switch 211 may reside in a data plane of the load balancing system 200, and controller 231 may reside in a control plane of load balancing system 200. Moreover, switch 211 and controller 231 may be provided on separate machines/devices that may be physically remote from each other (e.g., provided on different circuit boards, on different racks of a chassis, in different enclosures, in different rooms, in different buildings, etc.).

According to some embodiments of inventive concepts disclosed herein, observation of statefull protocols (such as TCP) may be used, and the protocol state may be maintained at end devices, such as client and server devices. When a packet is received by either a client or server device that is not intended for a current data flow connection, an abort indication/message (e.g., a reset or RST according to the TCP protocol) may be sent. In the TCP protocol, for example, as a general rule, reset (RST) is sent whenever a segment arrives which apparently is not intended for a/the current connection. See, Transmission Control Protocol (TCP), DARPA Internet Program, Protocol Specification, Sec. 3.4, Page 36, September 1981. Use of such statefull protocols may be used according to some embodiments to improve SDN based load balancing.

As discussed in U.S. application Ser. No. 13/936,745, load-balancing system 200 according to some embodiments disclosed herein may have three states: an Initialization state, a steady-state, and a transient state. In the initialization state, controller 231 installs limited number of flow entries in dataplane switch 211, and these flow entries may be called pre-provisioned flow entries. In the steady-state, there are no changes to servers 251 (e.g., no additions/deletions of servers) in the pool-of-servers that are servicing the clients. In the transient state, there is a change (e.g., an addition or deletion of a server, and/or a redistribution of loads between servers) in the pool-of-servers.

Load balancing system 200 according to embodiments disclosed herein may make use of three types of flow table flow entries: low priority pre-provisioned flow entries (e.g., a default flow entry including at least one unrestricted character), high priority dedicated flow entries (also referred to as flow-specific flow entries), and highest priority abort message flow entries. With low priority pre-provisioned (default) flow entries, the set of pre-provisioned (default) flow entries may allow for hash-function-like functionality, where a large number of all possible incoming flows are mapped to exactly one of the limited number of pre-provisioned (default) flow entries. Each pre-provisioned (default) flow entry is associated with one server in steady state and two-or-more servers in transient state. A pre-provisioned flow entry may be referred to as a default flow entry, and a pre-provisioned flow entry may include a match pattern having at least one unrestricted character so that the match pattern is satisfied by a plurality of data flow identifications. With high priority dedicated flow entries, each dedicated flow entry may have complete information to match an incoming flow (e.g., to match only one incoming flow), and a dedicated flow entry may always be associated with only one server. Highest priority "abort" message flow entries may be used only during transient state, and these abort message flow entries may cause matching "abort messages" coming from servers to be sent/redirected to the controller.

On start, controller 231 of load balancing system 200 may install a number of default flow entries in flow table 217a of dataplane switch 211. These default flow entries may be provided to ensure that any incoming packet is mapped to one-and-only one default flow entry.

In steady-state, an incoming data packet is received at dataplane switch 211 and is sent to one of the servers 251. More importantly, packets are not replicated to controller 231 in steady state. By reducing involvement of controller 231 during steady-state, load balancing performance may be improved. Reduced involvement of controller 231 may result in reduced computation and/or traffic resources being assigned to controller 231 in steady state. In a cloud environment (where resources can be dynamically provisioned and de-provisioned in matter of seconds), this can result in reduced operating expense. In addition, scalability of load balancing system 200 may be improved.

The transient state occurs when there is a change to the pool-of-servers (e.g., if a server is added or deleted from the pool-of-servers) and/or a redistribution of load between servers. As in U.S. application Ser. No. 13/936,745, transient state may result when a server association with one-or-more default flow entries is modified. This new server information, however, may need to be installed on the dataplane switch 231 without disrupting the existing flows (also referred to as legacy flows).

According to some embodiments of inventive concepts disclosed herein, during the transient state, controller 231 may associate two servers 251 (e.g., an old-server and a new-server) with a pre-provisioned flow entry (also referred to as a default flow entry). Incoming packets that match the pre-provisioned (default) flow entry are replicated to both associated servers. This may provide improvement by reducing replication of data packets to the controller.

As noted earlier, in statefull protocols (e.g., TCP), an end-point (e.g., a client or a server device) may send an "abort message" when a packet for a non-existent flow is received at that end point. According to some embodiments disclosed herein, due to replication of a data packet that is sent to two servers, the server that is not handling the data flow will send an "abort message". For example, a legacy data flow may be initiated with the old server before the default flow entry is modified to identify both old and new servers, and a subsequent non-initial data packet of this legacy data flow may be sent to both the old and new servers. Because the old server is already handling the legacy data flow, the old server can process the non-initial data packet of this legacy data flow. Because the new server never received the initial data packet for this legacy data flow, the new server with transmit an abort message responsive to each packet of the legacy data flow.

According to some embodiments disclosed herein, during the transient state, controller 231 instructs dataplane switch 211 to send/redirect "abort message" coming from the new and old servers 251 associated with the transient default flow entry to the controller 211 instead of sending them back to respective clients.

Due to the aforementioned operations (i.e., new and old servers sending "abort messages" for non-existing connections and dataplane switches 211 sending/redirecting the same to controller 231), controller 231 may be able to generate information relating to the flow and the server 251 associated with the flow during the transient state. Controller 231 can generate the flow information because the "abort message" may include sufficient information to identify the flow. Controller 231 can identify the server 251 associated with the flow which may be derived based on servers 251 associated with the pre-provisioned flow entry and the server 251 that sent the "abort message".

If the data flow is associated with the old-server associated with the transient default flow entry, controller 231 may install a high priority dedicated flow entry in the dataplane switch 211. Using this dedicated flow entry, further packets of the data flow may be sent directly to the old-server instead of being replicated to both the new and old servers. Over a period of time, based on "abort messages", controller 231 may install dedicated flow entries for all legacy (previously existing) data flows (associated with the old server) where the new-server is different from old-server.

When controller 231 does not install a dedicated flow entry for a (configurable) amount of time, controller 231 may assume that dedicated flow entries have been installed for all legacy data flows that are associated with an old-server. Controller 231 can then change the two servers (old-server and new-server) associated with default flow entry to the single new-server. With this change, load balancing system 200 (LB) may come back to steady-state operation (where all the default flow entries are associated with a single server).

According to some embodiments, each server 251 may provide an interface to extract information about the data flows being handled by a server(s) to reduce a number of data packets that are replicated during the transient state.

According to some embodiments, controller 231 may obtain information about data flows being handled by a server(s) 251 to install dedicated flow entries in a dataplane switch 211 during the transient state. Use of such an interface may be optional for some embodiments. When servers 251 provide such an interface, the interface can be used by the Controller to reduce a number of replicated packets.

As shown in FIG. 2, a flow table 217a may be maintained/saved in memory 271 of switch 211, and the flow table may include a plurality of flow entries. Each flow entry may include a match pattern, an action, and a priority. A match pattern may include values for protocol headers such as IP source address, IP destination address, TCP source port number, TCP destination port number, etc. For a default flow entry (also referred to as a pre-provisioned flow entry), the match pattern can include at least one unrestricted character (also referred to as a wildcard character) that can match any value. An action can include sending a matching packet to one or more servers and/or to the controller. Priority may be defined such that flow entries with higher priority levels may be matched before flow entries with lower priority levels. According to some embodiments, three levels of priority may be used as discussed above.

Switch 211 receives incoming data traffic through network interface 215. Switch processor 213 matches the incoming data packets against match patterns of flow entries in flow table 217a of memory 217 in accordance with priority levels of the flow entries. Once a match is found, switch processor 213 executes the action associated with the matching flow entry (e.g., sending the data packet through server interface 219 to one or more servers 251 and/or through controller interface 221 to controller 231).

Controller 231 may install the flow entries in flow table 217a of switch 211. Controller 231 may install three types of flow entries in flow table 217a of switch 211, including: low priority default (pre-provisioned) flow entries, high priority dedicated (flow-specific) flow entries, and abort message flow entries (highest priority).

Flow server mapping table 235a may be maintained in memory 235 of controller 231. The flow server mapping table 235a may keep the mapping between various flows encountered by switch 211 and the associated server(s) 251 (to which the data packets were forwarded). The flow server mapping table 235a also maintains information about the preprovisioned flow entry to which a flow matched.

Operation of load balancing system 200 can be broken down in three modes: (1) Initialization mode operation, (2) Stable mode operation, and (3) transient mode operation.

Initialization mode operations may be performed when the load balancing system starts operation. Initially, there may be no flow entries in flow table 217a of switch 211, and there may be no flow-to-server mappings in flow server mapping table 235a of controller 231. Controller 231 may install a limited number of default flow entries (also referred to as pre-provisioned flow entries) in flow table 217a of switch 211. During initialization mode, the default flow entries may have following characteristics: for any data flow, one and only one of the default flow entries will match; each default flow entry is associated with only one server; the action associated with each default flow entry is to send matching packets to associated server; and the default flow entry is assigned a low priority. As noted above, these default flow entries may be referred to as pre-provisioned flow entries. For a uniform traffic distribution, a proportion of data flows that are directed to a server may be dependent on a number of default flow entries that point to the server.

The default flow entries may provide that any data packet received at switch 211 is directed to one of the servers 251. Depending on capabilities of switch 211, a match pattern for each default flow entry can be constructed based on one or more of an ethernet source address, an ethernet destination address, an IP source address, an IP destination address, a TCP source port number, etc.

For example, consider a scenario where there are four servers, Server-1 (251-1), Server-2 (251-2), Server-3 (251-3), and Server-4 (251-4), and match patterns for the default flow entries are based on IP source addresses. One scheme to generate the default flow entries may be as shown in FIG. 3. As used herein and as illustrated in FIG. 3, an IP address is depicted in dotted decimal format, and the "X" symbol represents an unrestricted character (also referred to as a wildcard or 'don't care' value/character) in the match pattern.

In the example of FIG. 3, default flow entry ID FE-1 matches any IP source address ending in "0.1", default flow entry ID FE-2 matches any IP source address ending in "0.2", default flow entry ID FE-3 matches any IP source address ending in "0.3", default flow entry ID FE-4 matches any IP source address ending in "0.4", default flow entry ID FE-5 matches any IP source address ending in "0.5", and default flow entry ID FE-255 matches any IP source address ending in "0.255". For the example of FIG. 3, data packets received at switch 211 from IP source address 10.10.10.1 will be directed to server Server-1 (251-1), and those coming from IP source address 10.10.10.2 will be directed to server Server-2 (251-2).

During stable mode operation, dataplane switch 211 first attempts to forward data packets to respective servers based on a match against a (high priority) flow specific match pattern of a dedicated flow entry. If no match is found, then the flow is forwarded based on a match against one of the default flow entries. Controller 231 is not involved in any aspect of packet forwarding, and controller 231 is not involved for flow-setup or receiving replicated packets to maintain flow-to-server information.

During transient mode operations, there may be changes to a number of servers in a pool-of servers of the load balancing system 200. These changes may include adding and/or deleting a server(s) from the pool-of-servers and/or changing a proportion of traffic handled by a server (also referred to as load redistribution). Such changes may be enabled in current schemes by changing a server associated with default flow entry (from an old server to a new server).

During transient mode operations, controller 213 may modify a server associated with a default flow entry without affecting/changing legacy (previously existing) data flows handled by the old server to dynamically re-distribute load among servers. The default flow entries, however, may be difficult to modify directly, because direct modification could disrupt some legacy (previously existing) data flows being handled by the old server. For example, one of the default flow entries may initially send data flows to old server Server-1 (251-1), but after changes to the pool-of-servers, this default flow entry may need to be changed to send new data flows to new server Server-2 (251-2).

If the default flow entry were modified directly to point to server Server-2, legacy data flows that map to the default flow entry and are associated with old server Server-1 (i.e., continuing data flows for the old server that were initiated prior to the change) for which a dedicated flow entry (also referred to as a flow-specific flow entry) has not been installed in dataplane switch 211, may experience disruption. This disruption may occur because data packets for such legacy data flows may now be sent to server Server-2 (instead of server Server-1).

To support reduced hit and/or hitless modification of a default flow entry to point to a new server, the following operations may be performed.

1. Controller processor 233 determines the old and new servers for the default flow entry being modified. In the example of FIG. 4, the default flow entry with match pattern X.X.X.1 may initially send data flows to Server-1 (the old server), and controller processor 233 may determine that new data flows should be sent to Server-2 (the new server).
2. To initiate the transient state at operation 4-1 of FIG. 4, controller processor 233 transmits an instruction (through switch interface 237) to dataplane switch 211 to replicate data packets to both the old and new servers associated with the default flow entry (including match pattern X.X.X.1) being modified, when the old-server and new-server are different. Switch processor 213 receives the instruction (through controller interface 237) and modifies the default flow entry to include the list of servers (e.g., old and new servers Server-1 and Server-2) to which data packets matching the default flow entry will be sent/replicated. As used herein, the term transient default flow entry refers to a default flow entry that points to more than one server.

3. During transient state at operation 4-1 of FIG. 4, controller processor 233 also transmits an instruction (through switch interface 237) to dataplane switch 211 to redirect "abort messages" coming from servers associated with the modified default flow entry (i.e., old and new servers Server-1 and Server-2) to controller 231. Switch processor 233 receives the instruction (through controller interface 221, and responsive to the instruction, switch processor 233 installs an abort message flow entry at a highest priority in flow table 217a. Abort messages from old and new servers Server-1 and Server-2 may thus be redirected by switch processor 213 through controller interface 221 to controller 231. Controller processor 233 may thus receive any such redirected abort messages through switch interface 237, and the redirected abort messages from servers Server-1 and Server-2 may be used by controller processor 233 to generate information regarding and/or identifying previously existing legacy data flows associated with old server Server-1. The instructions of operation 4-1 may be transmitted together or separately. More particularly, each abort message from new server Server-2 may be used to identify a legacy data flow being handled by old server Server-1.

4. As data packets matching the default flow entry now associated with old and new servers Server-1 and Server-2 arrive at dataplane switch 211 (through network interface 215) at operation 4-2a of FIG. 4, the data packets are replicated to old and new servers Server-1 and Server-2 at operation 4-2b of FIG. 4. Because only one of Server-1 or Server-2 will be servicing the data flow of that packet, the other of Server-1 or Server-2 will send an "abort message" to switch 211. If the data packet belongs to a legacy data flow established with old server Server-1 before modifying the default flow entry, new server Server-2 will send an abort message to switch 211 at operation 4-3a of FIG. 4. Switch processor 213 will receive this abort message through server interface 219, and because the abort message matches with the abort message flow entry in flow table 217a, switch processor 213 redirects/sends the abort message through controller interface 237 to controller 231 at operation 4-3b of FIG. 4.

Figure 5:
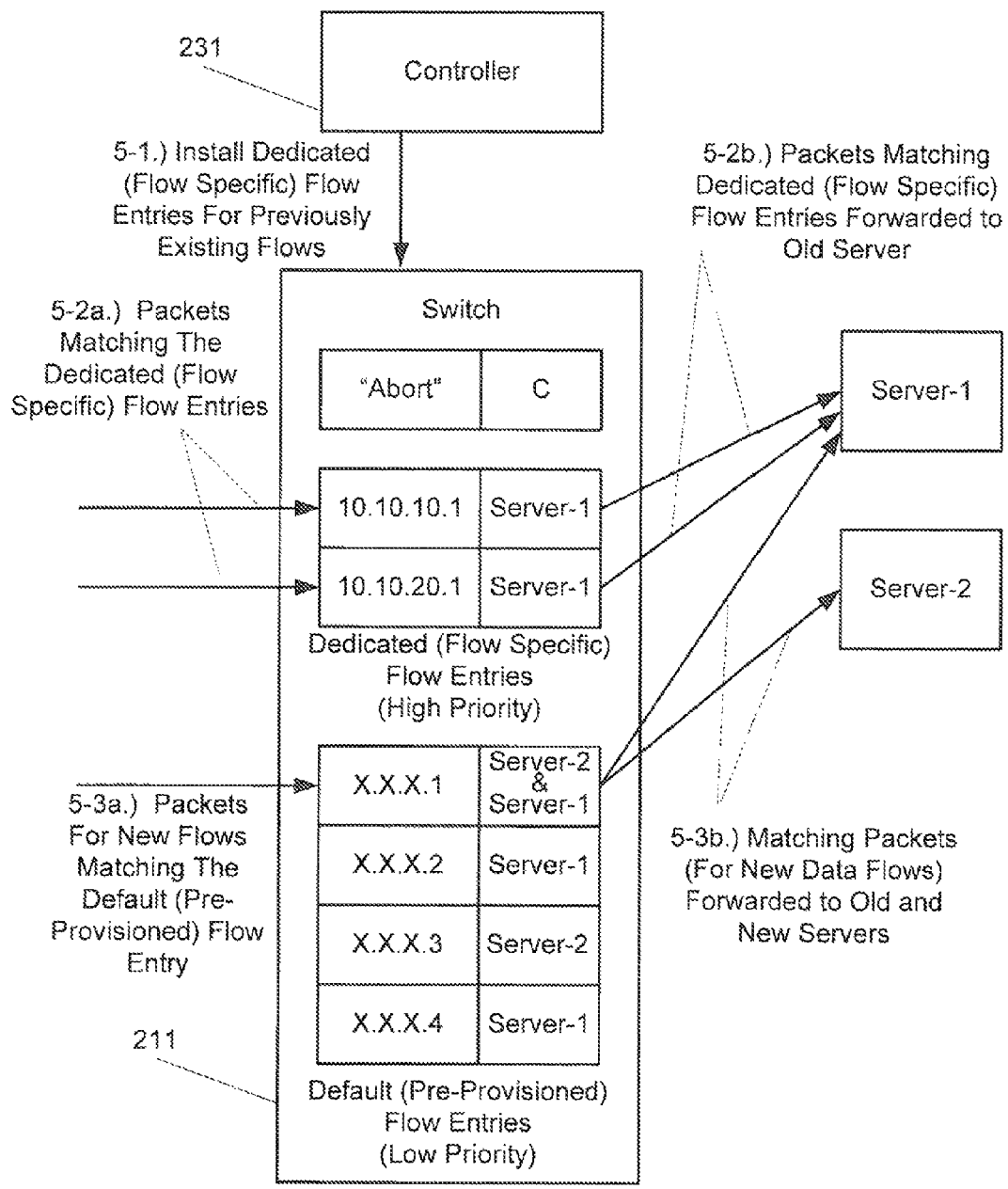

5. Based on receiving the "abort message" through switch interface 237 at operation 4-3b of FIG. 4, controller processor 233 may obtain information about existing legacy data flows (i.e., continuing data flows established with the old server Server-1 before modifying the default flow entry to direct data packets to both old and new servers Server-1 and Server-2). Controller processor 233 may also determine the server servicing the data flow based on the "abort message". Controller processor 233 may then create a dedicated flow entry (also referred to as a flow-to-server mapping or flow specific flow entry) and transmit an instruction to install the dedicated flow entry to dataplane switch 211 at operation 5-1 of FIG. 5. Since the dedicated (flow specific) flow entry has a higher precedence/priority than default flow entries, no further packets for this flow are replicated by switch 211. Each abort message received from new server Server-2 during the transient state may thus represent a different legacy data flow to old server Server-1 resulting in generation of a respective dedicated flow entry (e.g., dedicated flow entries including respective match patterns 10.10.10.1 and 10.10.20.1 as shown in FIG. 5). Data packets received at switch processor 213 (through network interface 215) are first compared to higher priority dedicated flow entries before matching with default flow entries. At operations 5-2a and 5-2b of FIG. 5, data packets matching match patterns of either of the dedicated flow entries are forwarded only to old server Server-1. At operations 5-3a and 5-3b of FIG. 5, data packets that do not match any dedicated flow entries are matched to a default flow entry, and data packets matching X.X.X.1 are forwarded to both old and new servers Server-1 and Server-2.

6. As an option, each server 251 may provide an interface to extract the information about the flows being handled by the server as discussed below with respect to FIG. 6.

7. At operation 6-1, controller 231 may use the interface with the old server Server-1 to get information about legacy data flows being handled by the old server Server-1. Controller processor 233 may then use this information at operation 6-2 to install dedicated flow entries in dataplane switch 211 for legacy data flows established with old server Server-1 before modifying the associated default flow entry. The controller can obtain information from servers in different ways, for example, including: by fetching (e.g., requesting) information from servers during transient state (option 1); by servers 251 sending/pushing (without a request from controller 231) the information to controller 211 either during transient state or all-the-time (option 2); and/or by severs sending the information to a common server all-the-time and controller 231 fetching the information from the common server during transient state (option 3).

Figure 6:
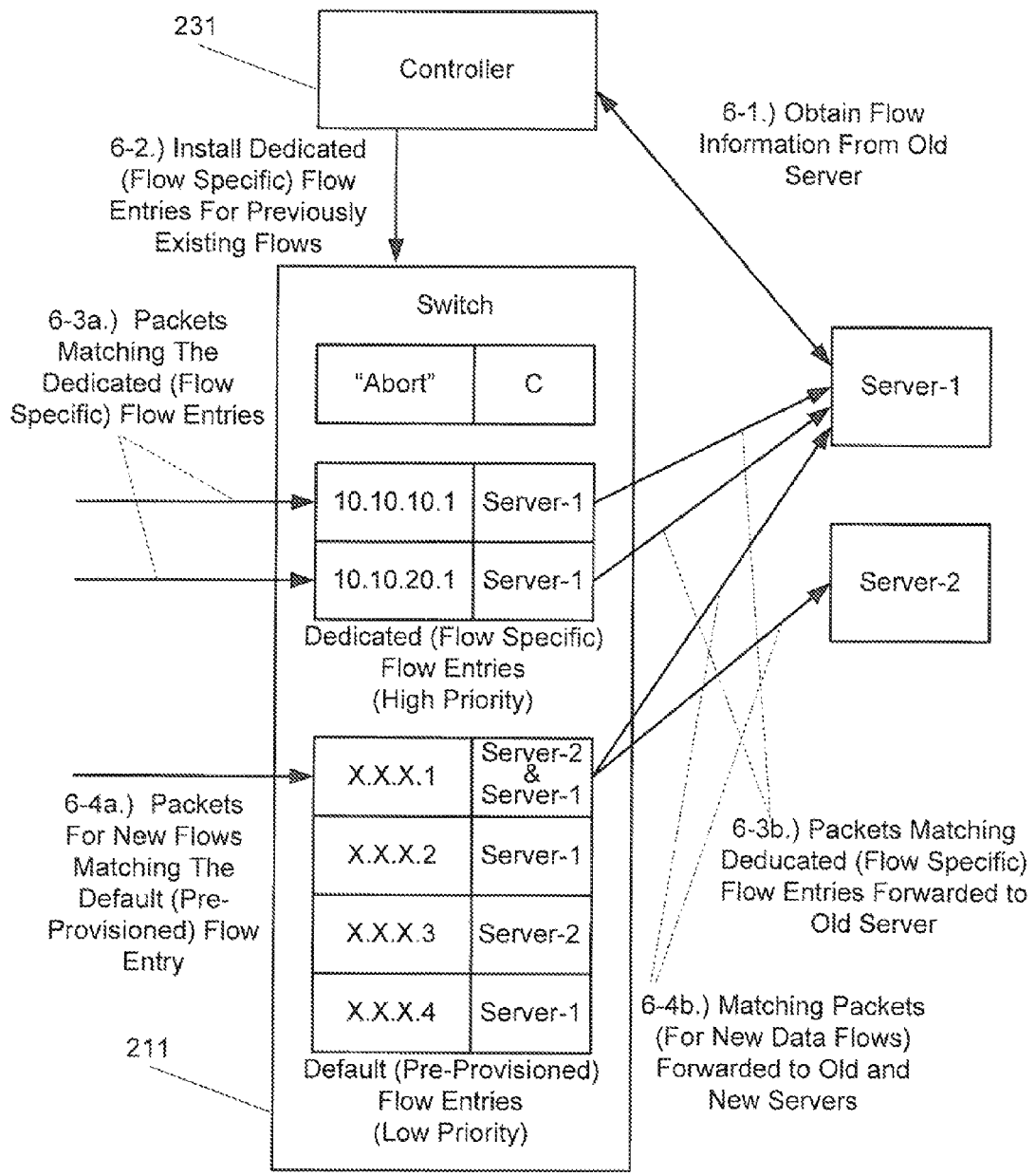

Operations of FIG. 6, for example, may thus be performed in combination with operations of FIGS. 4 and 5. By installing the abort message flow entry before modifying the default flow entry to point to two servers, operations of FIGS. 4 and 5 may allow quick provision of dedicated flow entries for old data flows before operations of FIG. 6 can be used to obtain information for all data flows being handled by old server Server-1. As noted above, operations of FIG. 6 may be optional. Moreover, operations of FIG. 6 may reduce time needed to set up dedicated flow entries for all data flows being handled by old server Server-1.

Each of the options mentioned above may allow a tradeoff between time required at controller 231 get flow-to-server mapping information versus network bandwidth used by controller, network bandwidth used servers, processing-and-storage required at controller, etc. For example, option 1 may use less network bandwidth by taking more time to provide flow-to-server mapping information for legacy data flows to controller 231. In option 2, with servers sending the information all-the-time-to controller, more network bandwidth may be used between server(s) 251 and controller 231. Also more processing resources may be used at controller 231. However, during transient state, option 2 may provide flow-to-server mapping information to controller in less time. Option 3 may provide a middle ground between option 1 and 2. FIG. 6 illustrates operations when option 1 is used.

According to some embodiments disclosed herein, involvement of controller 231 in data flow processing during steady-state operation may be reduced, and the consumption of computing resources at controller 231 may thus be reduced, because controller 231 may effectively be turned-off during steady state operation. Moreover, consumption of network resources may be reduced because controller 231 may not receive significant/any traffic during steady state operation. In addition, resources used to maintain high availability of controller 231 may be reduced, because controller 231 may be effectively turned-off during steady-state operations.

Figure 7:
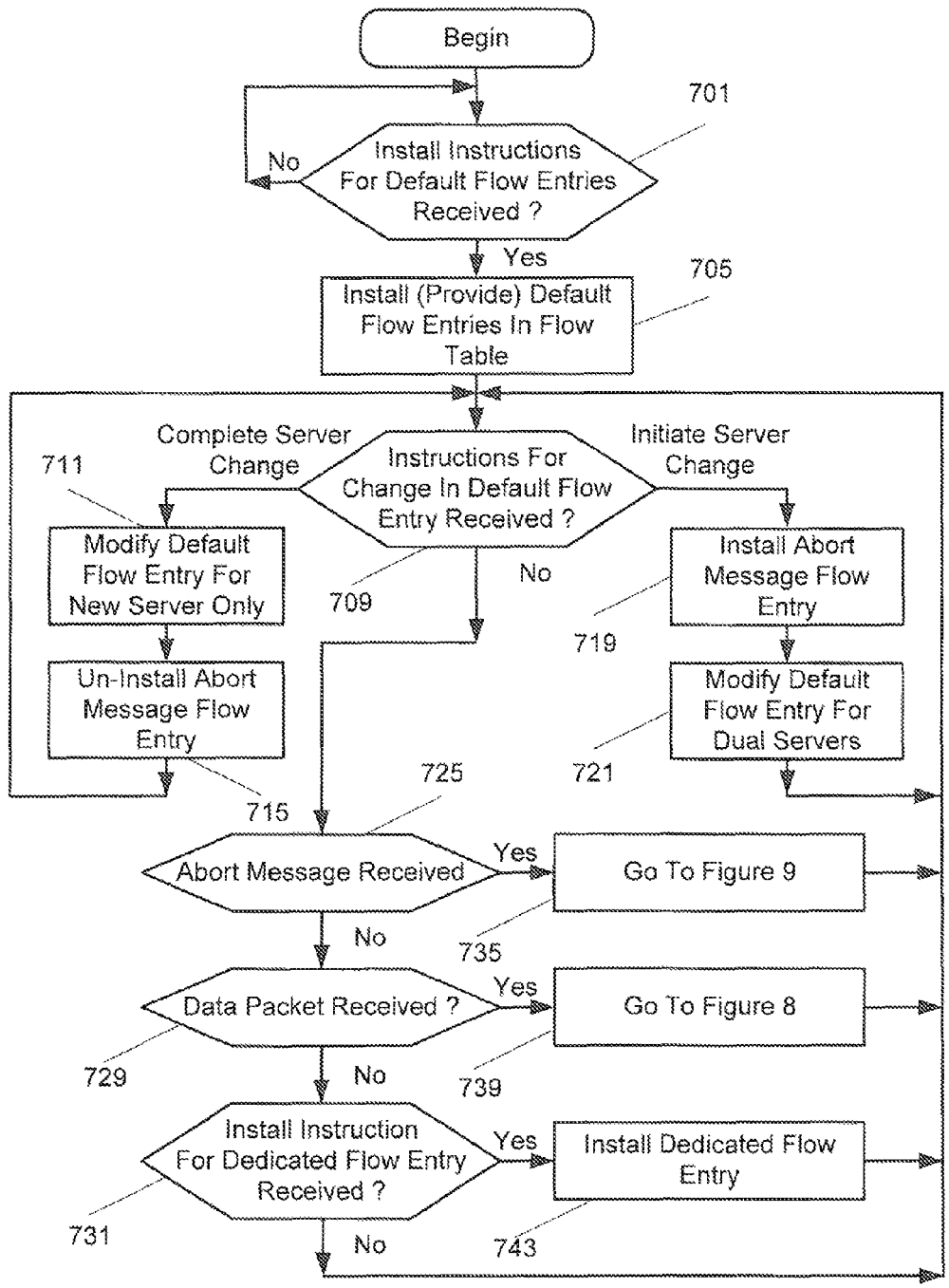
FIGS. 7, 8, and 9 are flow charts illustrating operations of the switch of FIG. 2 according to some embodiments of inventive concepts.
Figure 8:
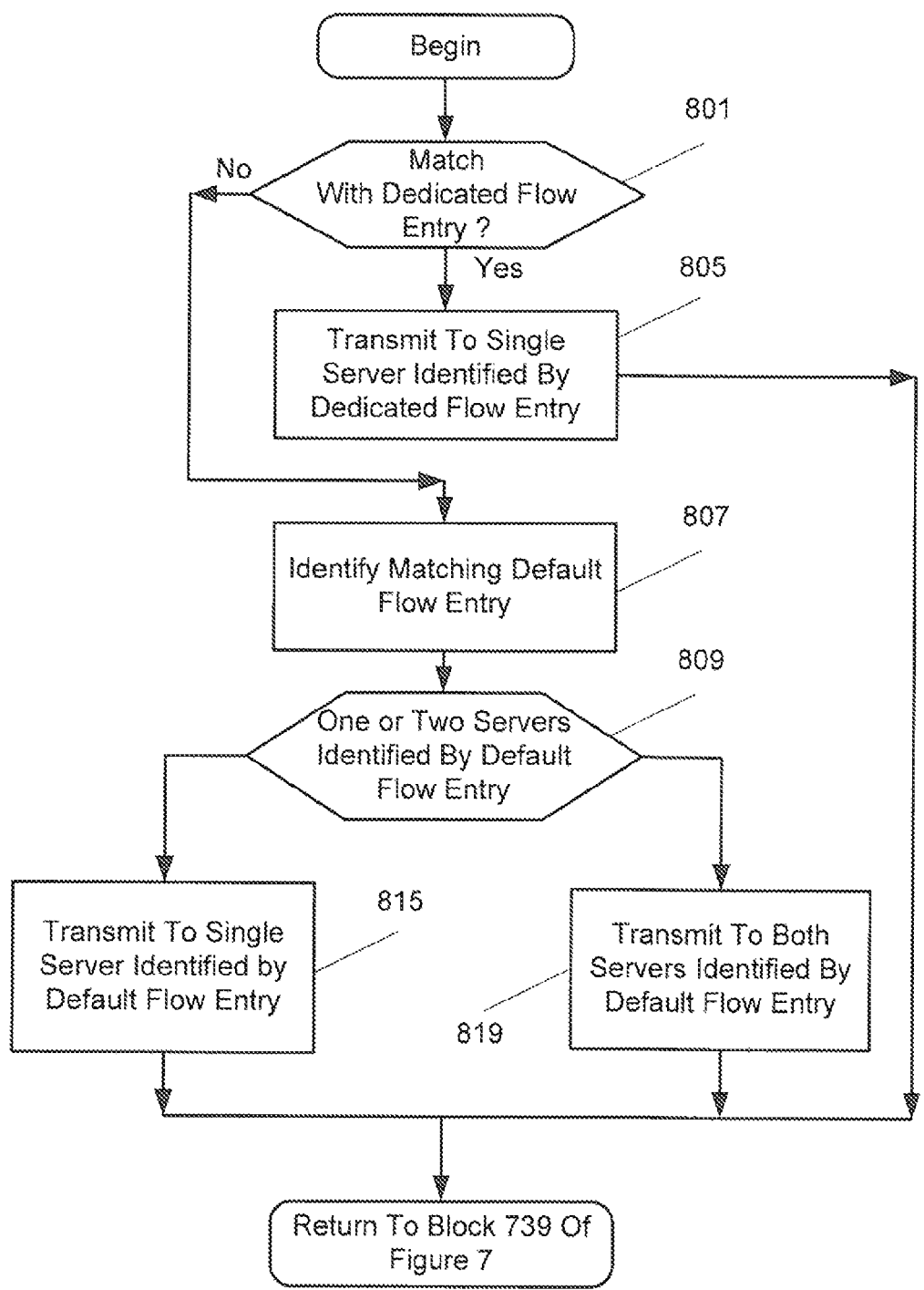
Figure 9:
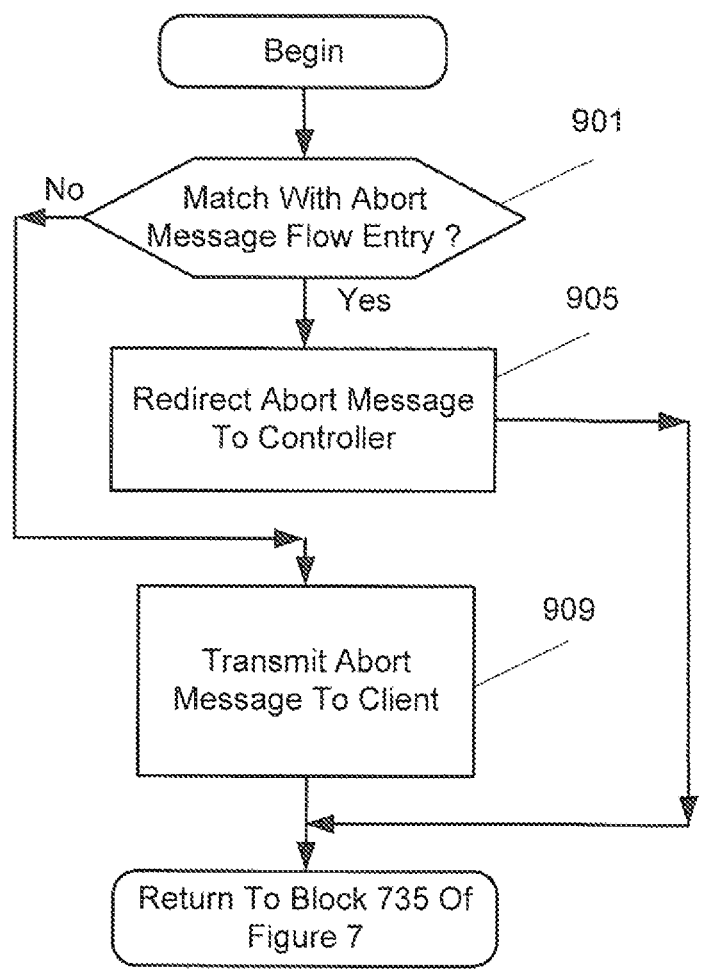

FIGS. 7, 8, and 9 are flow charts illustrating operations of switch 211 of load balancing system 200 of FIG. 2, and FIGS. 10, 11, and 12 are flow charts illustrating operations of controller 231 of load balancing system 200 of FIG. 2.

As discussed above, during initialization mode operations, controller processor 233 may transmit one or more install instructions through switch interface 237 to switch 211 to install default flow entries (also discussed below with respect to blocks 1001 and 1005 of FIG. 10). Upon receiving the install instructions for default flow entries at block 701 (through controller interface 221), switch processor 213 may install the default flow entries in flow table 217a at block 705. Each default flow entry may include a match pattern that is satisfied by a data flow identification or identifications, and each default flow entry may identify a server of the plurality of servers to which matching data packets are sent. More particularly, each default flow entry may include a match pattern including at least one unrestricted character so that the match pattern is satisfied by a plurality of data flow identifications. Each match pattern, for example, may be based on an IP source address. Examples of default flow entries are discussed above with respect to FIG. 3. Moreover, the match pattern of each default flow entry may be unique so that a data packet will match with only one default flow entry, and each default flow entry may identify a server (or servers) to which matching data packets are sent. As discussed above, each default flow entry may identify only a single server during initialization mode operations and stable (steady state) mode operations, but during transient mode operations, a default flow entry may identify two or more servers to which matching data packets are sent.

Until instructions for a change in a default flow entry are received at block 709, switch processor 213 may process data packets received from client devices through network interface 215 using the originally installed default flow entries (referred to as initialization mode operations). Upon receiving a data packet at block 729 of FIG. 7, processor will determine at block 739 of FIG. 7 and blocks 801, 807, and 809 of FIG. 8 whether the data packet matches with any dedicated flow entries and/or whether a default flow entry identifies one or two servers, but because there are no dedicated flow entries and only one server is identified by a default flow entry during initialization mode operations, processor 213 will transmit the data packet through server interface 219 to the single server identified by the default flow entry at block 815.

During initialization mode operations, there are no abort message flow entries in flow table 217a. Accordingly, if an abort message is received from any of the servers at block 725 and 735 of FIG. 7 during initialization mode operations, there will be no match with an abort message flow entry at block 901 of FIG. 9, and switch processor 213 will transmit the abort message through network interface 215 to the client device indicated in the abort message flow entry at block 909 of FIG. 9.

Operations of blocks 709, 725, 729, 735, 739, 801, 807, 809, 815, 901, and 909 may continue as discussed above for each data packet and abort message received during initialization mode operations, until transient mode operations are initiated for a default flow entry, for example, to support addition/removal of a server(s) from the pool of servers in the load balancing system 200 and/or to redistribute loads among the pool of servers in the load balancing system 200. Upon initiation of transient mode operations for a default flow entry, referred to as a transient default flow entry, processing of data packets and abort messages associated with the transient default flow entry will be modified as discussed below, but processing of data packets associated with stable default flow entries may continue unchanged as discussed above with respect to initialization mode operations.

As discussed in greater detail below with respect to block 1015 of FIG. 10, controller 231 may receive a modification request for a server(s) from the pool of servers at block 1009, and responsive to modification request, controller 231 may transmit an instruction(s) to install an abort message flow entry for abort messages from old and new servers associated with the transient default flow entry and to modify the transient default flow entry to identify both the old and new servers. Responsive to receiving this instruction(s) through controller interface 221 at block 709, switch processor 213 may install an abort message flow entry in flow table 217a at block 719 and modify the transient default flow entry in flow table to identify the old and new servers at block 721. The instructions to install the abort message flow entry and to modify the transient default flow entry may be received from the controller 231 in a single communication or in separate communications.

According to some embodiments, the abort message flow entry may be installed in flow table 217a before and/or concurrently with modifying the transient default flow entry in flow table 217a to ensure that all abort messages resulting from transient mode operations for the transient default flow entry are redirected to controller 231, and to ensure that no abort messages resulting from transient mode operations are forwarded to a respective client device. As shown for example in FIG. 4, the default flow entry with match pattern X.X.X.1 may be a transient default flow entry identifying both old and new servers Server-1 and Server-2, while other default flow entries (e.g., default flow entries with match patterns X.X.X.2, X.X.X.3, and X.X.X.4) continue to identify only a single server.

In the transient mode, data packets matching the transient default flow entry (e.g., matching match pattern X.X.X.1) are transmitted to both old and new servers Server-1 and Server-2 at block 819, while data packets matching stable default flow entries (e.g., matching match pattern X.X.X.2, X.X.X.3, or X.X.X.4) are forwarded to only the single server indicated by the respective default flow entry at block 815. Immediately after modifying the transient default flow entry, however, there may be no dedicated flow entries (also referred to as flow specific flow entries) associated with the transient default flow entry. With reference to FIG. 7, when a data packet is received through network interface 215 at block 729, switch processor 213 may first determine if the data packet matches a dedicated flow entry (also referred to as a flow specific flow entry) at block 801. If there is no match with any dedicated flow entries at block 801, switch processor 213 may identify the matching default flow entry at block 807 and determine if the matching default flow entry identifies one or two servers at block 809.

With reference to the example of FIG. 4, for data packets matching stable default flow entries (e.g., with match patterns X.X.X.2, X.X.X.3, and X.X.X.4) that identify only one server at block 809, switch processor 213 transmits the data packet (through server interface 219) to the single server identified by the matching default flow entry at block 815. With further reference to the example of FIG. 4, for data packets matching the transient default flow packet (e.g., with match pattern X.X.X.1) that identify old and new servers Server-1 and Server-2 at block 809, switch processor 213 transmits the data packet (through server interface 219) to both the old and new servers Server-1 and Server-2.

As discussed above, if the data packet is a data packet for a data flow that is already being served by the old server (e.g., the data flow was established with the old server Server-1 before modifying the transient default flow entry to identify old and new servers), the old server Server-1 will process the data packet, but the new server Server-2 will recognize that data packet is a non-initial data packet for a data flow that has not been established with the new server Server-2. Responsive to receiving the non-initial data packet for a data flow not established with the new server Server-2, the new server Server-2 will reply with an abort message. Upon receiving the abort message at block 725 through server interface 219, switch processor 213 will determine at block 901 if the abort message matches an abort message flow entry. Because the abort message was transmitted by new server Server-2 associated with the transient default flow entry, the abort message flow entry will match the abort message flow entry that was discussed above with respect to block 719. Responsive to the abort message matching the abort message flow entry, switch processor 213 will redirect the abort message through controller interface 221 to controller 231.

Figure 11:
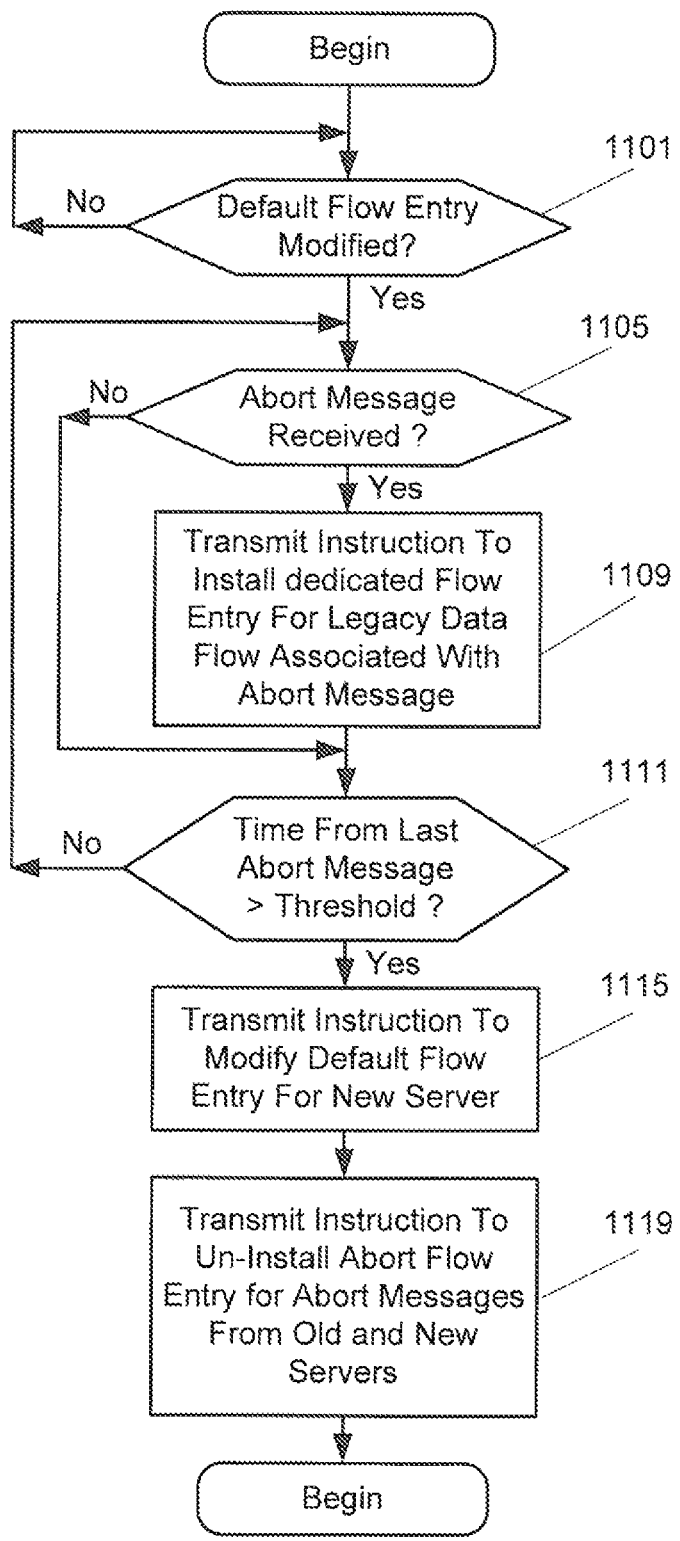

As discussed in greater detail below with respect to FIG. 11, controller 231 can determine based on the abort message from new server Server-2 that old server Server-1 is handling a legacy data flow associated with the abort message and associated with the data packet that triggered the abort message. Accordingly, controller 231 can transmit an instruction to switch 211 to install a dedicated flow entry for the legacy data flow associated with the abort message.

Responsive to receiving the instruction to install the dedicated flow entry through controller interface 221 at block 731, switch processor 213 may install a dedicated flow entry for the legacy data flow at block 743. Subsequent data packets for that legacy data flow may thus be processed using the dedicated flow entry as discussed in greater detail below with respect to blocks 801 and 805. For each legacy data flow established with the old server Server-1 prior to modifying the associated default flow entry to identify two servers, a first data packet of the data flow that is transmitted to both old and new servers at block 819 will cause the new server to generate an abort message that is redirected by switch 211 to controller 231, and controller 231 will instruct switch 211 to install a respective dedicated flow entry for the legacy data flow. Each subsequent data packet of such a legacy data flow with a matching dedicated flow entry may then be transmitted to the old server Server-1 identified by the respective dedicated flow entry without replication to new server Server-2. Referring to the example of FIG. 5, dedicated flow entries with match patterns 10.10.10.1 and 10.10.20.1 may both identify the old server Server-1, and switch processor 213 may transmit data packets matching these dedicated flow entries to only the old server Server-1.

During transient mode operations, old server Server-1 may be instructed to reject new data flows associated with the transient default flow entry. Accordingly, initial data packets for new data flows that match the transient default flow entry (with match pattern X.X.X.1) may be transmitted to both old and new servers Server-1 and Server-2. Old server Server-1 may reject each new data flow associated with the transient default flow entry, and each new data flow associated with the transient default flow entry may thus be established with new server Server-2. As data packets for these new data flows are transmitted to both old and new servers Server-1 and Server-2, abort messages may be transmitted by old server Server-1, and these abort messages from old server Server-1 may be redirected to controller 231 at block 905 so that the abort messages are not transmitted to respective client devices. Controller 231 may disregard the abort messages from old server Server-1 because dedicated flow entries are not needed for these new data flows.

According to some embodiments, controller processor 237 may also transmit instructions to install dedicated flow entries responsive to abort messages received from old server Server-1. Once a new data flow is established with new server Server-2, data packets may continue to be replicated to both old and new servers Server-1 and Server-2 resulting in abort messages form old server Server-1. By generating dedicated flow entries for these new data flows to new server Server-2 responsive to abort messages received from old server Server-1, replication of data packets to both old and new servers may be reduced and a volume of abort messages from the old server may be reduced. Responsive to receiving an instruction through controller interface 221 for a dedicated flow entry for a new data flow to new server Server-2 at block 731, switch processor 213 may install the dedicated flow entry in flow table 217a at block 743. Accordingly, subsequent data packets for the new data flow may be received through network interface 215 at blocks 729 and 739, matched with the respective dedicated flow entry at block 801, and transmitted only to new server Server-2 at block 805.

In addition, according to some embodiments, controller 231 may obtain information regarding data flows supported by old server Server-1 directly from the old server as discussed above with respect to the example of FIG. 6. Controller 321 may thus transmit instructions for switch 211 to install some dedicated flow entries without waiting for an abort message. Such controller operations are discussed in greater detail below with respect to FIG. 12.

Controller 231 may determine when to transition the transient default flow entry to a stable state identifying only the new server as discussed in greater detail below with respect to FIG. 11. Once instructions are received through controller interface 221 to transition the default flow entry to the stable state at block 709, server processor 213 may modify the default flow entry to identify only the new server at block 711, and server processor 213 may un-install the abort message flow entry associated with the default flow entry at block 715. The dedicated flow entries may be maintained after modifying the default flow entry to identify only the new server to continue supporting legacy data flows for the old server Server-1. For example, all dedicated flow entries may be removed from flow table 217a after a period of time (after modifying the transient default flow entry) deemed sufficient to support legacy data flows, or each dedicated flow entry may be removed from flow table 217a after a threshold period of time has passed without receiving a data packet for the respective data flow. According to some other embodiments, dedicated flow entries may be removed from flow table 217a responsive to instructions received from controller 231.

Figure 12:
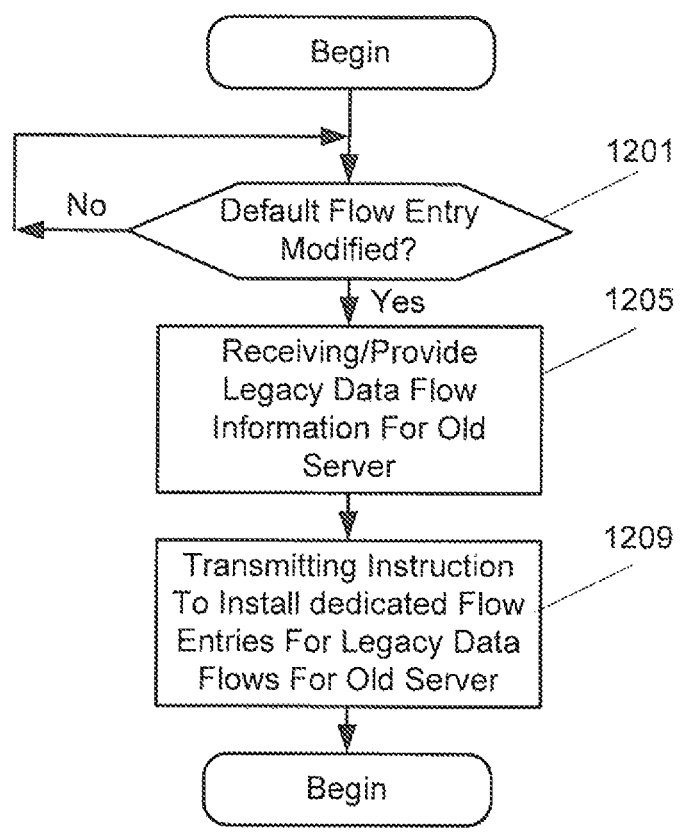

Operations of controller 233 are discussed in greater detail below with respect to FIGS. 10, 11, and 12. Responsive to triggering load balancing system 200 initialization at block 1001 of FIG. 10, controller processor 233 may transmit instructions through switch interface 237 to switch 211 to install default flow entries in flow table 217a at block 1005. Default flow entries are discussed above, for example, with respect to FIG. 3 and with respect to blocks 701 and 705 of FIG. 7.

Responsive to a request/decision at block 1009 to modify a server from the pool of servers (e.g., to add a server, to remove a server, to redistribute loads between servers, etc.), controller processor 237 may identify at block 1011 a default flow entry for modification during the transient mode operations and old and new servers to be associated with the default flow entry during the transient mode operations. At blocks 1015 and 1019, controller processor 237 may transmit instructions through switch interface 237 to switch 211 to install an abort message flow entry for abort messages from the old and new servers and to modify the default flow entry to identify the old and new servers. According to some embodiments, the instructions of blocks 1015 and 1019 may be transmitted in a single communication, or the instructions of blocks 1015 and 1019 may be transmitted separately with the instructions of block 1015 being transmitted before the instructions of block 1019. More particularly, controller processor 237 may transmit instructions to install the abort flow entry for abort messages from the old and new servers corresponding to the default flow entry that has been identified for modification. Accordingly, the abort flow entry may not affect processing of abort messages generated by the new and/or old servers relating to data packets corresponding to default flow entries other than the one identified for modification.

Figure 10:
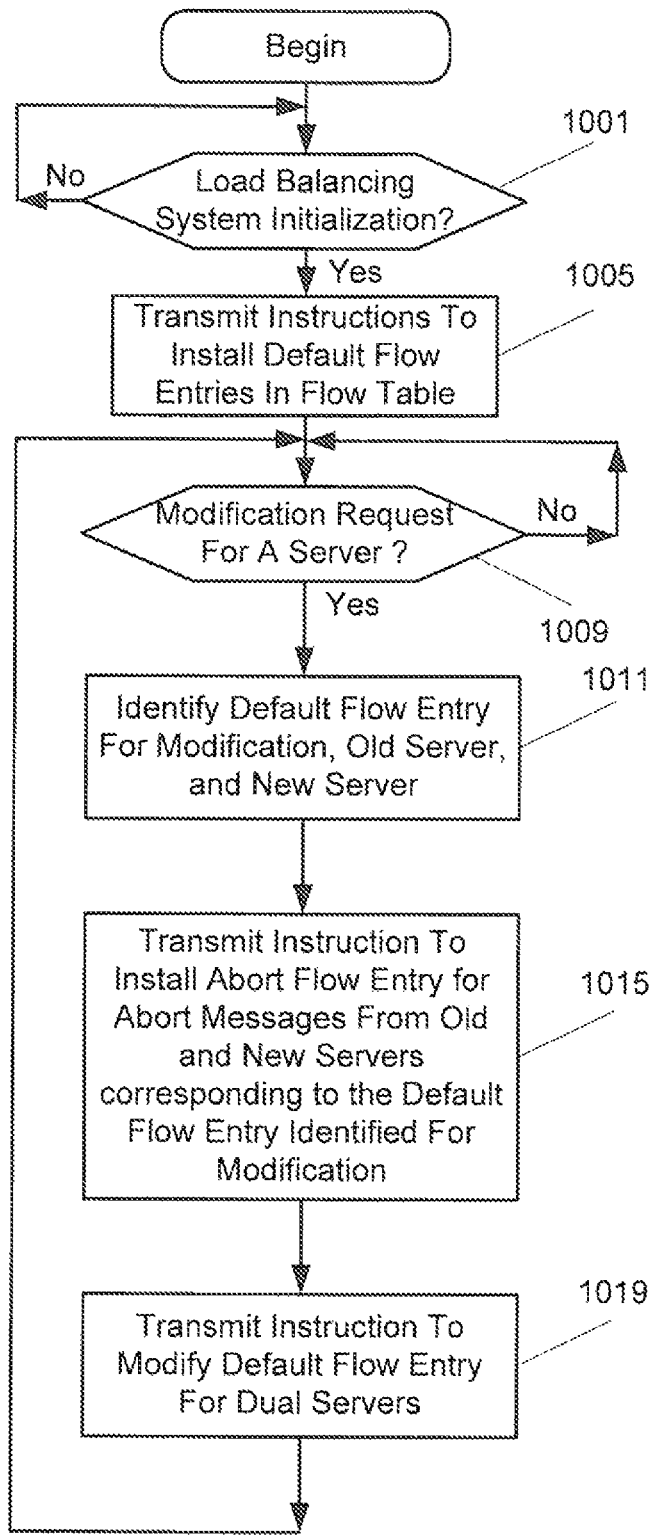
FIGS. 10, 11, and 12 are flow charts illustrating operations of the controller of FIG. 2 according to some embodiments of inventive concepts.

Operations of FIG. 10 may thus provide the instructions to install default flow entries (received at block 705 of FIG. 7), to modify default flow entries (received at block 709 of FIG. 7), and to install abort message flow entries (received at block 709 of FIG. 7). Operations of controller 231 during transient mode operations are discussed below with respect to FIG. 11.

Upon modifying a default flow entry and installing an abort message flow entry at block 1101, controller processor 233 monitors for receipt of an abort messages associated with the abort message flow entry. Upon receipt of an abort message through switch interface 237 at block 1105, controller processor 233 determines if the abort message represents a legacy data flow initiated with the old server Server-1 before modifying the default flow entry. In other words, if the abort message is from the new server Server-2, the abort message may represent such a legacy data flow. If the abort message is from the old server Server-1, however, the abort message may not represent a legacy data flow, and the abort message may be disregarded.

For an abort message representing a legacy data flow at block 1105, controller processor 233 may transmit an instruction to install a dedicated flow entry for the legacy data flow associated with the modified default flow entry at block 1109. The instruction to install the dedicated flow entry may be received at switch 211 as discussed above with respect blocks 731 and 743 of FIG. 7.

According to some embodiments, controller processor 237 may also transmit instructions to install dedicated flow entries responsive to abort messages received from old server Server-1. Once a new data flow is established with new server Server-2, data packets may continue to be replicated to both old and new servers Server-1 and Server-2 resulting in abort messages form old server Server-1. By generating dedicated flow entries for these new data flows to new server Server-2 responsive to abort messages received from old server Server-1, replication of data packets to both old and new servers may be reduced and a volume of abort messages from the old server may be reduced.

At block 1111, controller processor 233 may determine how long to maintain the modified default flow entry in the transient mode identifying both old and new servers. According to some embodiments, controller processor 233 may restart a timer each time an abort message is received from the new server, and controller processor 233 may terminate transient mode for the modified default flow entry once the timer exceeds a threshold. According to some other embodiments, controller processor 233 may wait a predetermined time after modifying the default flow entry to terminate transient mode for the modified default flow entry.

Responsive to deciding to terminate transient mode for the modified default flow entry at block 1111, controller processor 233 may transmit instructions through switch interface 237 to switch 211 at blocks 1115 and 1119 to modify the default flow entry to identify only the new server Server-2 and to un-install the abort message flow entry for abort message from the old and new servers. The instructions of blocks 1115 and 1119 may be transmitted using the same or different communications.

As discussed above with respect to FIG. 6, information regarding legacy data flows may also be obtained by controller 231 directly from the old server Server-1. Such operations are discussed in greater detail with respect to the flow chart of FIG. 12. Upon modifying a default flow entry and installing an abort message flow entry at block 1201, controller processor 233 may receive information regarding legacy data flows from old server Server-1 at block 1205, and controller processor 233 may transmit instructions through switch interface 237 to switch 211 to install dedicated flow entries for these legacy data flows at block 1209. According to some embodiments, the legacy data flow information may be requested responsive to initiating transient mode operation for the old server so that the information is only requested when needed. According to some other embodiments, controller processor 233 may request data flow information periodically from all servers and/or all servers may periodically provide data flow information so that the controller may have more rapid access to legacy data flow information when needed.

In the above-description of various embodiments of the present inventive concepts, it is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which the present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module", a "processor", or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the following claims and their equivalents, and shall not be restricted or limited by the foregoing detailed description and/or by reference numbers included therein which are provided only by way of example. Any reference numbers in the claims are provided only to identify examples of elements and/or operations from embodiments of the figures/specification without limiting the claims to any particular elements, operations, and/or embodiments of any such reference numbers.

That which is claimed is:

1. A method of operating a switch coupled with a plurality of servers and a controller, the method comprising:
providing a flow entry in a flow table, wherein the flow entry includes a match pattern that is satisfied by a data flow identification, and wherein the flow entry identifies a first server of the plurality of servers;
receiving a first data packet including a first data flow identification;
responsive to the first data flow identification satisfying the match pattern, transmitting the first data packet to the first server;
after transmitting the first data packet to the first server, modifying the flow entry to add an identification of a second server so that the flow entry identifies the first server and the second server;
after modifying the flow entry, receiving a second data packet including a second data flow identification; and
responsive to the second data flow identification satisfying the match pattern, transmitting the second data packet to the first server and to the second server.

2. The method of claim 1 wherein the first and second data flow identifications are the same so that the first and second data packets are of a same data flow, the method further comprising:
after transmitting the second data packet to the first and second servers, receiving an abort message from the second server corresponding to the second data packet; and
redirecting the abort message to the controller.

3. The method of claim 2 further comprising:
after redirecting the abort message to the controller, installing a dedicated flow entry in the flow table for the data flow of the first and second data packets, wherein the dedicated flow entry includes a match pattern that is satisfied by the data flow identification of the first and second data packets, and wherein the dedicated flow entry identifies the first server.

4. The method of claim 3 further comprising:
after installing the dedicated flow entry, receiving a third data packet including a third data flow identification that is the same as the first and second data flow identifications so that the third data flow identification matches the match pattern of the flow entry and the match pattern of the dedicated flow entry; and
responsive to the third data flow identification matching the match pattern of the dedicated flow entry, transmitting the third data packet to the first server.

5. The method of claim 4 further comprising:
after installing the dedicated flow entry, modifying the flow entry to remove the identification of the first server so that the flow entry identifies the second server without identifying the first server;
after modifying the flow entry to remove the identification of the first server, receiving a fourth data packet having a fourth data flow identification different than the first data flow identification; and responsive to the fourth data flow identification matching the match pattern of the flow entry without matching the match pattern of the dedicated flow entry, transmitting the fourth data packet to the second server without transmitting the fourth data packet to the first server.

6. The method of claim 5 further comprising:
after modifying the flow entry to remove the identification of the first server, un-installing the abort message flow entry from the flow table.

7. The method of claim 2 further comprising:
before receiving the second data packet, installing an abort message flow entry in the flow table, wherein the abort message flow entry includes the match pattern of the flow entry;
wherein redirecting the abort message comprises redirecting the abort message responsive to the abort message matching the match pattern of the abort message flow entry.

8. The method of claim 1 wherein the first and second data flow identifications are different data flow identifications of respective first and second data flows.

9. The method of claim 1 wherein the second server is not identified by the flow entry between receiving and transmitting the first data packet.

10. The method of claim 9 wherein the flow entry is a default flow entry, and wherein the match pattern includes at least one unrestricted character so that the match pattern is satisfied by a plurality of data flow identifications.

11. The method of claim 1 wherein the flow entry is a first flow entry in the flow table, wherein the match pattern is a first match pattern, and wherein the data flow identification is a first data flow identification, the method further comprising:
providing a second flow entry in the flow table, wherein the second flow entry includes a second match pattern that is satisfied by a second data flow identification, wherein the second flow entry identifies a third server of the plurality of servers, and wherein the first and second match patterns are different.

12. A method of operating a controller coupled with a switch in a load balancing system, wherein the switch provides a flow table to define processing for received data packets, the method comprising:
transmitting an instruction to install a flow entry in the flow table at the switch wherein the flow entry includes a match pattern that is satisfied by a flow identification, and wherein the flow entry identifies a first server of the plurality of servers; and
after transmitting the instruction to install the flow entry, transmitting an instruction to modify the flow entry in the flow table at the switch to add an identification of a second server so that the flow entry identifies the first server and the second server.

13. The method of claim 12 further comprising:
transmitting an instruction to install an abort message flow entry in the flow table, wherein the abort message flow entry includes the match pattern of the of the flow entry.

14. The method of claim 13 wherein transmitting the instruction to install the abort message flow entry precedes transmitting the instruction to modify the flow entry.

15. The method of claim 13 further comprising:
after transmitting the instructions to install the abort message flow entry and modify the flow entry, receiving an abort message generated by the second server and redirected from the switch responsive to the abort message flow entry.

16. The method of claim 15 further comprising:
responsive to receiving the abort message, transmitting an instruction to install a dedicated flow entry in the flow table for a data flow corresponding to the abort message, wherein the dedicated flow entry includes a match pattern that is satisfied by a data flow identification from the abort message, and wherein the dedicated flow entry identifies the first server.

17. The method of claim 16 further comprising:
after transmitting the instruction to install the dedicated flow entry, transmitting an instruction to modify the flow entry to remove the identification of the first server so that the flow entry identifies the second server without identifying the first server.

18. The method of claim 17 wherein transmitting the instruction to modify the flow entry to remove the identification of the first server comprises transmitting the instruction to modify the flow entry to remove the identification of the first server responsive to passage of a threshold period of time without receiving an abort message generated by the second server.

19. The method of claim 17 further comprising:
after transmitting the instruction to install the dedicated flow entry, transmitting an instruction to un-install the abort flow entry from the flow table.

20. The method of claim 12 further comprising:
obtaining a data flow identification from the first server wherein the data flow identification is for a data flow being handled by the first server; and
responsive to receiving the data flow identification for the data flow being handled by the first server, transmitting an instruction to install a dedicated flow entry in the flow table for the data flow being handled by the first server, wherein the dedicated flow entry includes a match pattern that is satisfied by the data flow identification obtained from the first server, and wherein the dedicated flow entry identifies the first server.

21. The method of claim 12 wherein the flow entry is a default flow entry, and wherein the match pattern includes at least one unrestricted character so that the match pattern is satisfied by a plurality of data flow identifications including the data flow identification.

22. The method of claim 12 wherein the flow entry is a first flow entry, wherein the match pattern is a first match pattern, and wherein the data flow identification is a first data flow identification, and wherein transmitting the instruction further comprises,
transmitting an instruction to install a second flow entry in the flow table, wherein the second flow entry includes a second match pattern that is satisfied by a second data flow identification, and wherein the first and second match patterns are different.

23. A load balancing switch comprising:
a controller interface configured to provide communications with a load balancing controller;
a server interface configured to provide communications with a plurality of servers;
a network interface configured to provide communications with a plurality of client devices over a network;
a memory configured to provide a flow table including a flow entry wherein the flow entry includes a match pattern that is satisfied by a data flow identification, and wherein the flow entry identifies a first server of the plurality of servers;
a switch processor coupled to the controller interface, the server interface, the network interface, and the memory, the processor being configured to,
receive a first data packet including a first data flow identification through the network interface,
responsive to the first data flow identification satisfying the match pattern, transmitting the first data packet to the first server through the server interface,
modify the flow entry to add an identification of a second server so that the flow entry identifies the first server and the second server, after transmitting the first data packet to the first server,
receive a second data packet including a second data flow identification through the network interface after modifying the flow entry, and
transmit the second data packet through the server interface to the first server and to the second server responsive to the second data flow identification satisfying the match pattern.

24. A load balancing controller comprising:
a switch interface configured to provide communications with a load balancing switch including a flow table to define processing for received data packets; and
a processor coupled to the switch interface, wherein the processor is configured to,
transmit an instruction through the switch interface to install a flow entry in the flow table at the switch wherein the flow entry includes a match pattern that is satisfied by a flow identification, and wherein the flow entry identifies a first server of the plurality of servers, and
after transmitting the instruction to install the flow entry, transmit an instruction through the switch interface to modify the flow entry in the flow table at the switch to add an identification of a second server so that the flow entry identifies the first server and the second server.

* * * * *